US012770926B2

(12) United States Patent
Yang et al.

(10) Patent No.: US 12,770,926 B2
(45) Date of Patent: Oct. 20, 2026

(54) METHOD FOR MAKING LITHIUM FOIL ANODE OF ALL-SOLID-STATE LITHIUM BATTERY

(71) Applicant: Ming Chi University of Technology, New Taipei City (TW)

(72) Inventors: Chun-Chen Yang, New Taipei City (TW); Yi-Shiuan Wu, New Taipei City (TW); Chelladurai Karuppiah, New Taipei City (TW); Shimelis Lemma Besha, New Taipei City (TW)

(73) Assignee: Ming Chi University of Technology, New Taipei City (TW)

( * ) Notice: Subject to any disclaimer, the term of this patent is extended or adjusted under 35 U.S.C. 154(b) by 586 days.

(21) Appl. No.: 17/570,883

(22) Filed: Jan. 7, 2022

(65) Prior Publication Data

US 2023/0026993 A1 Jan. 26, 2023

(30) Foreign Application Priority Data

Jul. 16, 2021 (TW) ................................ 110126211

(51) Int. Cl.
*H01M 10/058* (2010.01)
*H01M 10/0525* (2010.01)

(52) U.S. Cl.
CPC ..... *H01M 10/058* (2013.01); *H01M 10/0525* (2013.01); *H01M 2300/0068* (2013.01); *H01M 2300/0082* (2013.01)

(58) Field of Classification Search
CPC ........... H01M 10/058; H01M 10/0525; H01M 2300/0068; H01M 2300/0082
See application file for complete search history.

(56) References Cited

U.S. PATENT DOCUMENTS 5,186,877 A * 2/1993 Watanabe ........... H01M 4/8846 264/105
2004/0009402 A1* 1/2004 Adachi ................... H01M 4/13 429/233
2019/0372125 A1* 12/2019 Miyamae ............. H01M 4/667

FOREIGN PATENT DOCUMENTS

CN 108832097 A * 11/2018 ........ H01M 10/0525
CN 109638350 A 4/2019
CN 111430663 A 7/2020
KR 20050043453 A * 5/2005 .......... H01M 10/056
(Continued)

OTHER PUBLICATIONS

Machine Translation—WO-2019059662 (Year: 2019).*
(Continued)

*Primary Examiner* — Ula C Ruddock
*Assistant Examiner* — Christina Renee Daulton
(74) *Attorney, Agent, or Firm* — Fox Rothschild LLP; Carol E. Thorstad-Forsyth

(57) ABSTRACT

A method for making a lithium foil anode of an all-solid-state lithium battery includes the steps of: a) dispersing a carbon nanomaterial in water to form a dispersion; b) mixing dopamine with the dispersion so as to permit the dopamine to perform a polymerization reaction in the dispersion to obtain a surface-modified carbon nanomaterial which is surface-modified by polydopamine; c) forming a regular sub-millimeter textured structure on a lithium foil; d) mixing the surface-modified carbon nanomaterial with a lithium ion-containing polymer to form a mixture; and e) applying the mixture on the lithium foil.

7 Claims, 11 Drawing Sheets

(56) References Cited

FOREIGN PATENT DOCUMENTS

WO WO-2019059662 * 3/2019 .......... H01M 10/052

OTHER PUBLICATIONS

Machine Translation—CN-108832097-A (Year: 2018).*
Machine Translation—KR_20050043453_A (Year: 2005).*
Search Report issued in Taiwan Patent Application No. 110126211 dated Aug. 25, 2021.

* cited by examiner

METHOD FOR MAKING LITHIUM FOIL ANODE OF ALL-SOLID-STATE LITHIUM BATTERY

CROSS-REFERENCE TO RELATED APPLICATION

This application claims priority of Taiwanese Invention Patent Application No. 110126211, filed on Jul. 16, 2021.

FIELD

The disclosure relates to a method for making an anode, and more particularly to a method for making a lithium foil anode of an all-solid-state lithium battery.

BACKGROUND

Currently available all-solid-state lithium batteries (ASSLB), in which an anode thereof is made of lithium, have a very high theoretical energy density, and are adapted as an energy source for portable electronic equipment and electric vehicles.

However, during the charging/discharging process of the ASSLB, formation of lithium dendrites is a main factor causing a short circuit and a thermal runaway of the ASSLB, which limit a large-scale commercialization of the ASSLB. In addition, because of an insufficient contact between a solid-state electrolyte membrane and electrodes of the ASSLB, which is caused by a thick solid electrolyte interphase (SEI) formed by grown lithium dendrites and dead lithium, the ASSLB might have a high interfacial resistance, resulting in a severe degradation of the battery capacity, and adversely affecting a cycle life of the ASSLB.

SUMMARY

An object of the disclosure is to provide a method for making a lithium foil anode of an all-solid-state lithium battery that can alleviate at least one of the drawbacks of the prior art.

According to the disclosure, a method for making a lithium foil anode of an all-solid-state lithium battery includes the steps of:

a) dispersing a carbon nanomaterial in water to form a dispersion;
b) mixing dopamine with the dispersion so as to permit the dopamine to perform a polymerization reaction in the dispersion to obtain a surface-modified carbon nanomaterial which is surface-modified by polydopamine;
c) forming a regular sub-millimeter scale textured structure on a lithium foil;
d) mixing the surface-modified carbon nanomaterial with a lithium ion-containing polymer to form a mixture; and
e) applying the mixture on the lithium foil.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
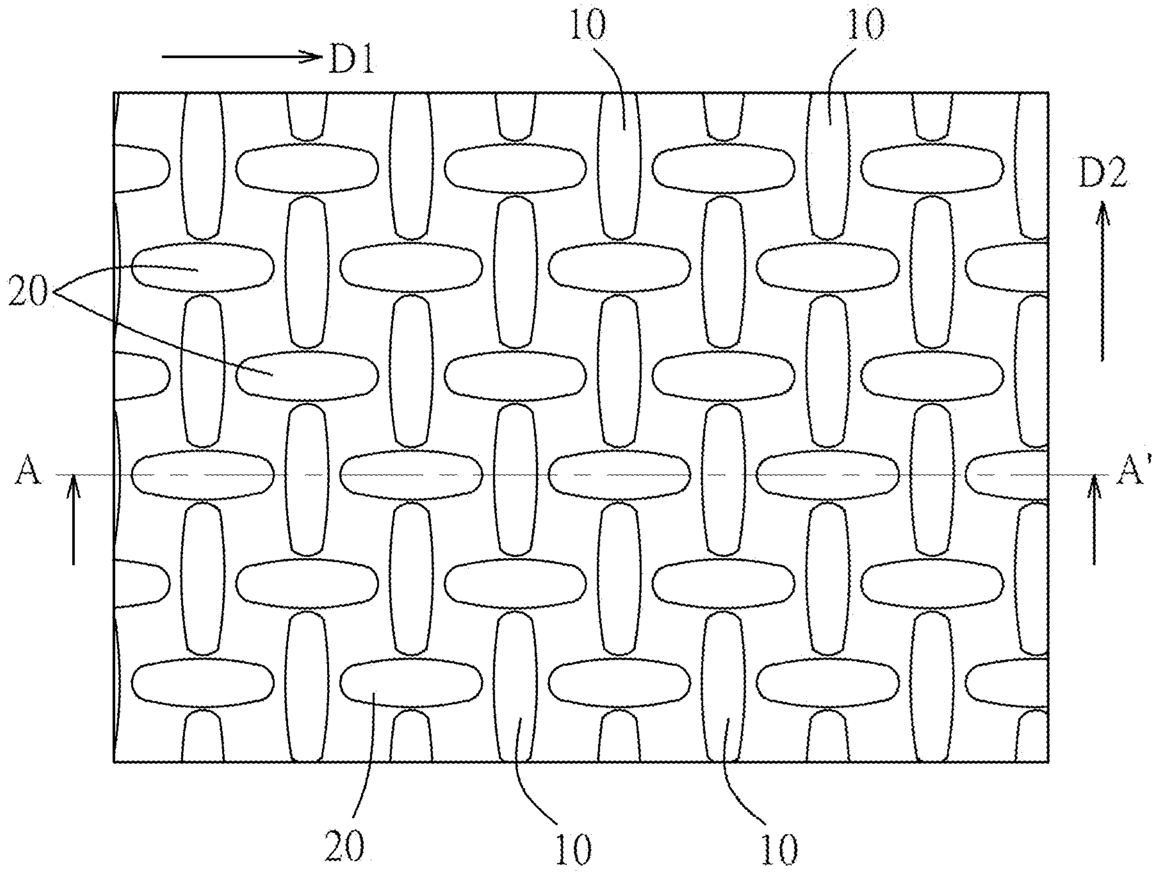
FIG. 1 is a schematic top view illustrating a regular sub-millimeter scale textured structure on a lithium foil formed during an embodiment of a method for making a lithium foil anode of an all-solid-state lithium battery according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

A method for making a lithium foil anode of an all-solid-state lithium battery according to the disclosure includes the steps of:

a) dispersing a carbon nanomaterial in water to form a dispersion;
b) mixing dopamine with the dispersion so as to permit the dopamine to perform a polymerization reaction in the dispersion to obtain a surface-modified carbon nanomaterial which is surface-modified by polydopamine;
c) forming a regular sub-millimeter scale textured structure on a lithium foil;
d) mixing the surface-modified carbon nanomaterial with a lithium ion-containing polymer to form a mixture; and
e) applying the mixture on the lithium foil.

In some embodiments, in step a), the carbon nanomaterial may be carbon fiber, carbon nanotube, graphene, graphene oxide, carbon black, or combinations thereof. In illustrated examples, the carbon nanomaterial is a vapor grown carbon fiber (VGCF).

In some embodiments, in step b), the polymerization reaction may be performed by introducing a tris(hydroxymethyl)aminomethane buffer solution in the dispersion. In some embodiments, the polymerization reaction may be performed in the dispersion having a pH value ranging from 8.0 to 9.0. In the illustrated examples, the polymerization reaction is performed in the dispersion having a pH value of 8.5.

In some embodiments, step c) may be performed by cold pressing the lithium foil with a metal mesh having a textured pattern for forming the regular sub-millimeter scale textured structure. In some embodiments, the cold pressing may be performed at a pressure ranging from 25 psi to 150 psi. In the illustrated examples, the cold pressing is performed at a pressure ranging from 50 psi to 100 psi. In some embodiments, the metal mesh may be a copper mesh, a nickel mesh, a titanium mesh, a platinum mesh, a stainless steel mesh, or combinations thereof. In the illustrated examples, the mesh is the copper mesh.

Figure 2:
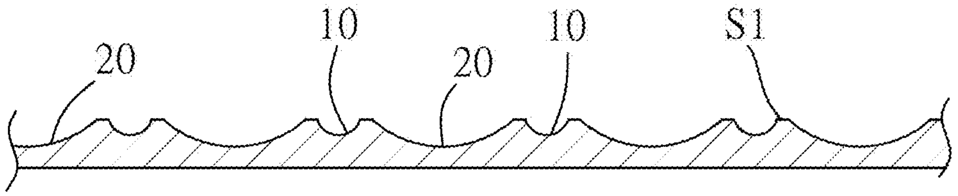
FIG. 2 is a schematic cross-sectional view of the lithium foil taken along line A-A' of FIG. 1.

Referring to FIGS. 1 and 2, the regular sub-millimeter scale textured structure formed in step c) may include a plurality of columns of first depressions 10 and a plurality of rows of second depressions 20.

Specifically, the plurality of columns of first depressions 10 are formed on a surface (S1) of the lithium foil. The columns of the first depressions 10 are displaced from each other in a first direction (D1). Each of the columns of the first depressions 10 includes a plurality of the first depressions 10 which are displaced from each other in a second direction (D2) transverse to the first direction (D1). The first depressions 10 of each of the columns of the first depressions 10 are staggered with the first depressions 10 of an adjacent one of the columns of the first depressions 10.

The plurality of rows of second depressions 20 are formed on the surface (S1) of the lithium foil. The rows of the second depressions 20 are displaced from each other in the second direction (D2). Each of the rows of the second depressions 20 includes a plurality of the second depressions 20 which are displaced from each other in the first direction (D1). The second depressions 20 of each of the rows of the second depressions 20 are staggered with the second depressions 20 of an adjacent one of the rows of the second depressions 20 such that one of the first depressions 10 is surrounded by four of the second depressions 20, and one of the second depressions 20 is surrounded by four of the first depressions 10.

In some embodiments, each of the first and second depressions 10, 20 is configured as a spindle-like shape having a length ranging from 450 μm to 650 μm.

In some embodiments, in step d), a weight ratio of the surface modified carbon nanomaterial to the lithium ion-containing polymer may range from 1:2 to 1:20. In the illustrated examples, the weight ratio of the surface modified carbon nanomaterial to the lithium ion-containing polymer is 1:10.

In some embodiments, the lithium ion-containing polymer may be a lithium ion-containing Nafion (Li-Nafion). Nafion is a sulfonated tetrafluoroethylene-based fluoropolymer-copolymer. The source of the lithium ion may be selected from lithium hydroxide, lithium nitrate, lithium acetate, lithium chloride, lithium hydrogen phosphate, lithium phosphate, lithium carbonate, or combinations thereof. In the illustrated examples, the source of the lithium ion is hydrated lithium hydroxide.

Examples of the disclosure will be described hereinafter. It is to be understood that these examples are exemplary and explanatory and should not be construed as a limitation to the disclosure.

Example 1: Preparation of a Lithium Foil Electrode (E) of an All-Solid-State Lithium Battery 100 mg of vapor grown carbon fibers (VGCF, commercially available from Yonyu Applied Technology Material Co., Ltd., Taiwan; Model no.: GS013010) having a one-dimensional structure was dispersed in 100 mL of deionized water, followed by sonicating using a probe-type sonicator (commercially available from QSONICA; Model no.: Q700) for 75 minutes at a power of 2 W to 3 W, an amplitude of 10 my, a frequency of 20 kHz, a pulse on time of 20 minutes, and a pulse off time of 5 minutes, so as to form a dispersion.

Dopamine (100 mg) was mixed with the dispersion under stirring, and a tris(hydroxymethyl) aminomethane hydrochloride buffer solution (Tris-HCl, 99%, commercially available from Hopax Chemical Manufacturing Co., Ltd., Taiwan) was introduced to the dispersion to adjust a pH value of the dispersion to be about 8.5. After that, the dispersion was maintained at 25° C. under stirring for 24 hours to permit dopamine to perform a polymerization reaction in the dispersion, followed by centrifugation at a speed of 6000 rpm for 30 minutes and collecting a precipitate. The precipitate was washed with deionized water, followed by drying in an oven at 80° C. for 12 hours, so as to obtain surface-modified carbon nanofibers having a one-dimensional structure and surface-modified by polydopamine.

A circular smooth lithium foil with a radius of 0.75 cm and a thickness of 200 μm was cold pressed with a copper mesh having a textured pattern and a thickness of 100 μm to 300 μm at a pressure ranging from 50 psi to 100 psi, so as to form a regular sub-millimeter scale textured structure on the lithium foil.

Hydrated lithium hydroxide ($LiOH \cdot H_2O$, 25.2 mg, commercially available from Sigma-Aldrich) was mixed with a Nafion solution (10 mL, a 5 wt % solution in a solvent including aliphatic alcohol and water, commercially available from Sigma-Aldrich), followed by stirring at 60° C. for 2 hours, and then drying under vacuum at 80° C. for 12 hours, so as to obtain a lithium ion-containing Nafion (Li-Nafion). After that, Li-Nafion was dispersed in N-methyl-2-pyrrolidone (NMP) to obtain a Li-Nafion dispersion, which was stirred continuously at 80° C. for 6 hours.

The surface-modified carbon nanofibers were mixed with the Li-Nafion dispersion in a weight ratio of the surface-modified carbon nanofibers to the Li-Nafion dispersion being 1:10 to form a mixture. The mixture was applied on the lithium foil formed with the regular sub-millimeter scale textured structure using a polyethylene terephthalate (PET) sheet, followed by drying under an argon atmosphere at 25° C., and then drying under vacuum at 80° C. for 2 hours, so as to obtain the lithium foil electrode (E).

The thickness of the lithium foil before and after applying the mixture of the surface-modified carbon nanofibers and the Li-Nafion dispersion was measured using a digital thickness gauge to calculate the thickness of the mixture applied on the lithium foil, which ranges from 5 μm to 7 μm.

Comparative Example 1: Preparation of a Lithium Foil Electrode (CE1) of an All-Solid-State Lithium Battery The lithium foil electrode (CE1) of an all-solid-state lithium battery of Comparative Example 1 was a circular smooth lithium foil with a radius of 0.75 cm and a thickness of 200 μm.

Comparative Example 2: Preparation of a Lithium Foil Electrode (CE2) of an All-Solid-State Lithium Battery The lithium foil electrode (CE2) of an all-solid-state lithium battery of Comparative Example 2 was prepared according to the procedures similar to those of Example 1, except that the lithium foil formed with the regular sub-millimeter scale textured structure was not applied with the mixture of the surface-modified carbon nanofibers and the Li-Nafion dispersion.

Comparative Example 3: Preparation of a Lithium Foil Electrode (CE3) of an All-Solid-State Lithium Battery The lithium foil electrode (CE3) of an all-solid-state lithium battery of Comparative Example 3 was prepared according to the procedures similar to those of Example 1, except that a circular smooth lithium foil with a radius of 0.75 cm and a thickness of 200 μm was not cold pressed with a copper mesh, and was applied directly with the mixture of the surface-modified carbon nanofibers and the Li-Nafion dispersion.

Optical Microscope (OM) Analysis

The surface topography of each of the lithium foil electrodes (E) of Example 1 and the lithium foil electrodes (CE1 to CE3) of Comparative Examples 1 to 3 was observed using an optical microscope. The results are shown in FIGS. 3 to 6.

Figure 3:
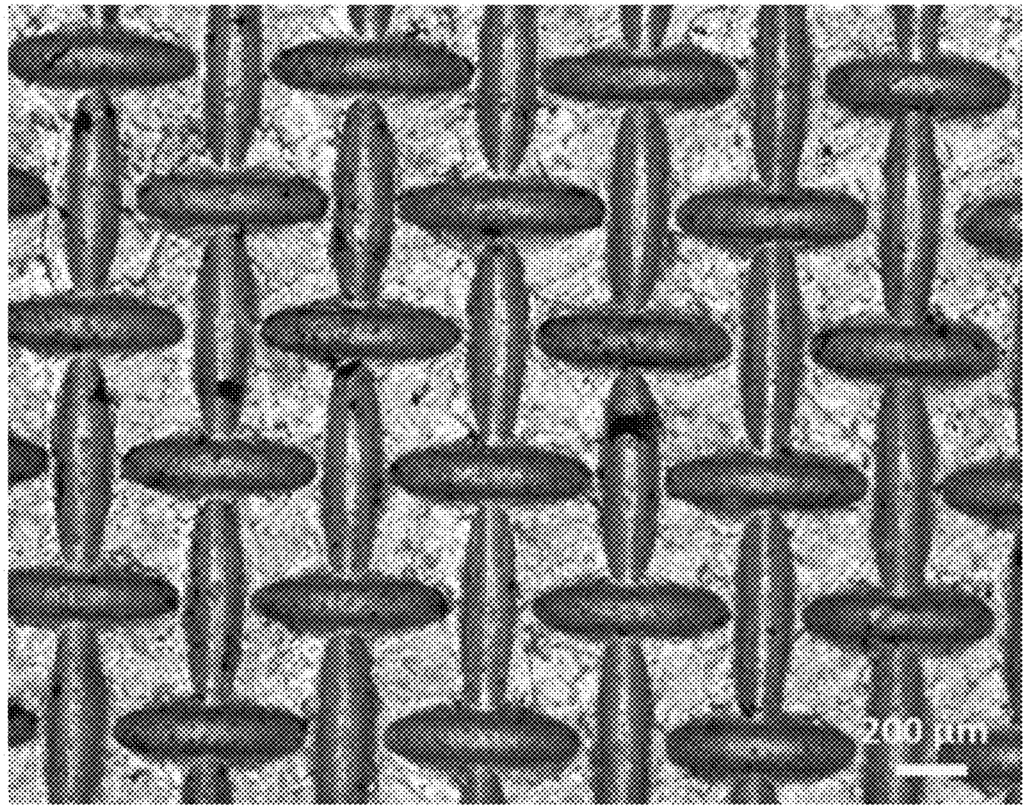
FIGS. 3 to 6 are optical microscopy images of lithium foil anodes of all-solid-state lithium batteries of Example 1 and Comparative Examples 1 to 3, respectively.
Figure 4:
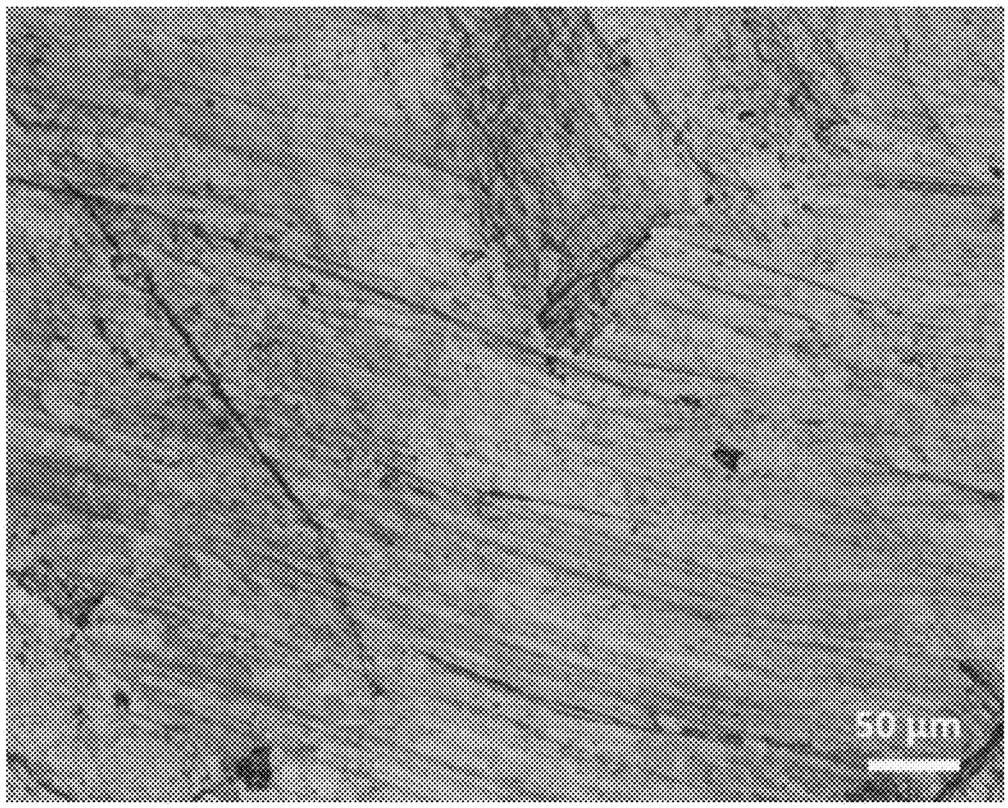
Figure 5:
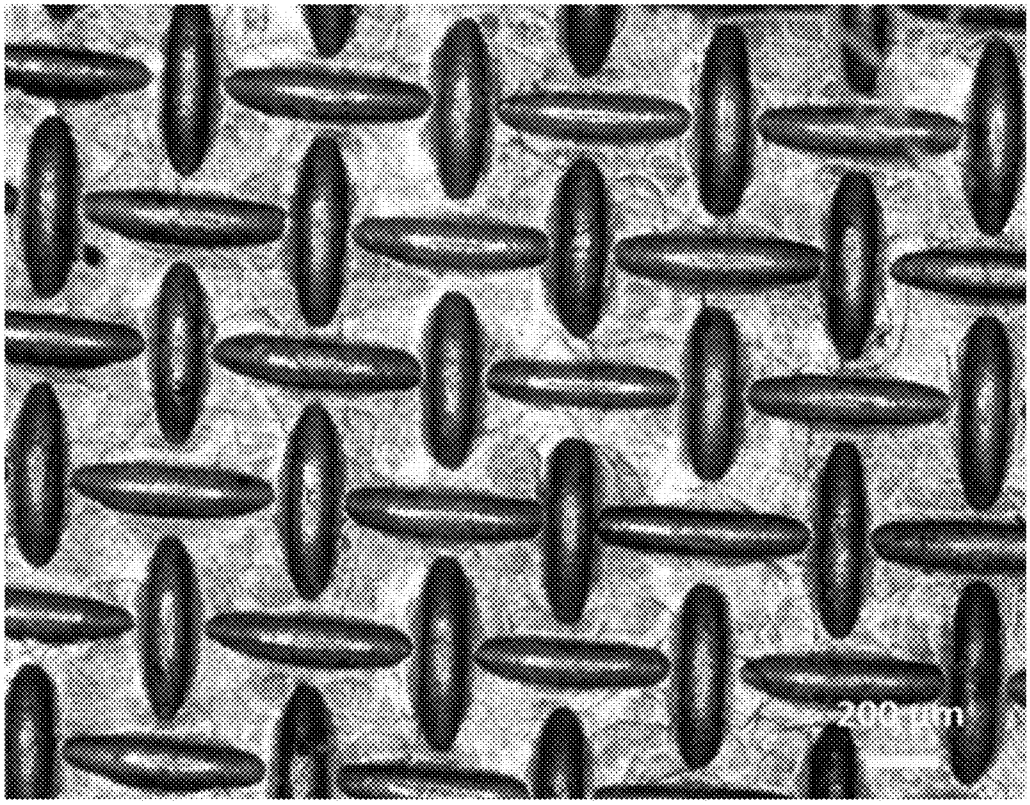
Figure 6:
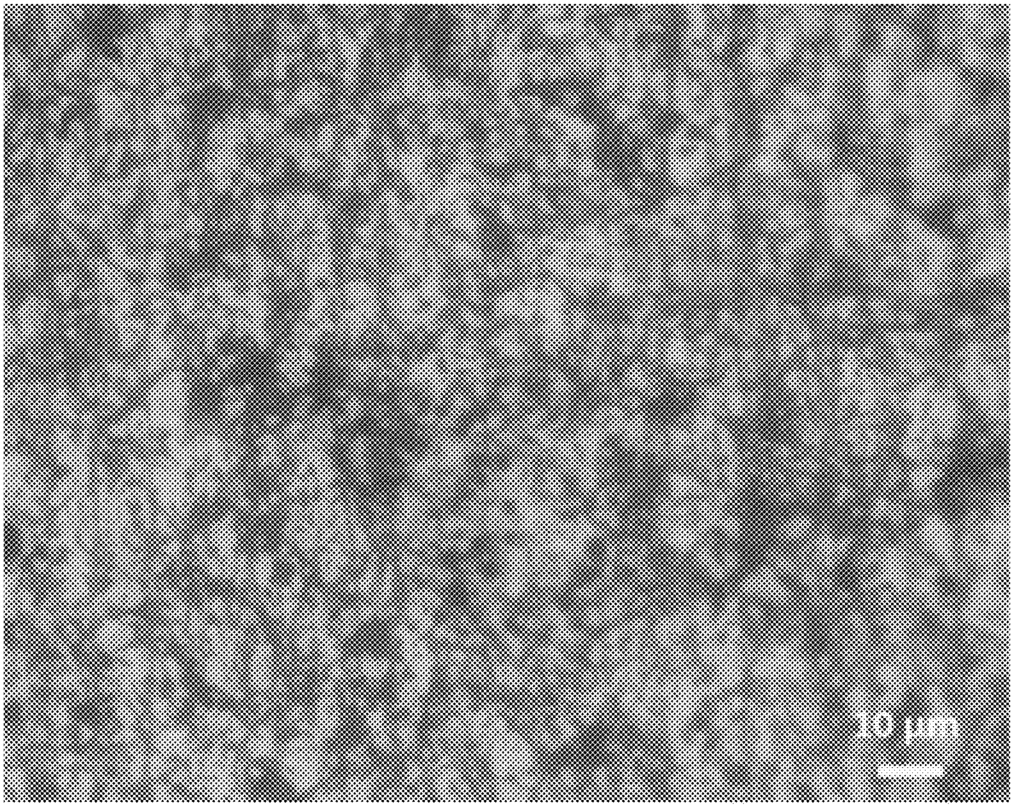

As shown in FIGS. 3 and 5, a regular sub-millimeter scale textured structure was found on each of the lithium foil electrode (E) of Example 1 and the lithium foil electrode (CE2) of Comparative Example 2. Such regular sub-millimeter scale textured structure was similar to that as mentioned above, and the details thereof are omitted for the sake of brevity. In the regular sub-millimeter scale textured structure, each of the depressions was configured as a spindle-like shape having a length of 590 μm, a width of 135 μm, and a depth ranging from 30 μm to 60 μm. On the other hand, the regular sub-millimeter scale textured structure was not found on each of the lithium foil electrodes (CE1 and CE3) of Comparative Examples 1 and 3, as shown in FIGS. 4 and 6.

Application Example 1: Preparation of an All-Solid-State Symmetric Battery ($SC_E$)

Two lithium foil electrodes (E) of Example 1 were used as a positive electrode (i.e., a cathode) and a negative electrode (i.e., an anode), respectively.

Two layers of poly(vinylidene fluoride)-co-hexafluoropropylene (PVDF-HFP) and one layer of PVDF-HFP containing aluminum-doped lithium lanthanum zirconium oxide ($Li_{6.25}Al_{0.25}La_3Zr_2O_{12}$, Al-LLZO) were sandwiched to form a three-layered sandwich structure (i.e., PVDF-HFP/PVDF-HFP@Al-LLZO/PVDF-HFP, in which PVDF-HFP@Al-LLZO denotes the layer of PVDF-HFP containing Al-LLZO sandwiched between the two layers of PVDF-HFP). The three-layered sandwich structure was used as a composite polymer electrolyte membrane (CPE membrane) and had a thickness of 240 μm.

The cathode, the anode, and the composite polymer electrolyte membrane were composed to form the all-solid-state symmetric battery ($SC_E$).

Comparative Application Example 1: Preparation of an All-Solid-State Symmetric Battery ($SC_{CE1}$)

The all-solid-state symmetric battery ($SC_{CE1}$) of Comparative Application Example 1 was prepared according to the procedures similar to those of Application Example 1, except that in the all-solid-state symmetric battery of the Comparative Application Example 1 ($SC_{CE1}$), two lithium foil electrodes (CE1) of Comparative Example 1 were used as the positive electrode and the negative electrode, respectively.

Comparative Application Example 2: Preparation of an All-Solid-State Symmetric Battery ($SC_{CE2}$)

The all-solid-state symmetric battery ($SC_{CE2}$) of Comparative Application Example 2 was prepared according to the procedures similar to those of Application Example 1, except that in the all-solid-state symmetric battery ($SC_{CE2}$) of the Comparative Application Example 2, two lithium foil electrodes (CE2) of Comparative Example were used as the positive electrode and the negative electrode, respectively.

Comparative Application Example 3: Preparation of an All-Solid-State Symmetric Battery ($SC_{CE3}$)

The all-solid-state symmetric battery ($SC_{CE3}$) of Comparative Application Example 3 was prepared according to the procedures similar to those of Application Example 1, except that in the all-solid-state symmetric battery ($SC_{CE3}$) of the Comparative Application Example 3, two lithium foil electrodes (CE3) of Comparative Example 3 were used as the positive electrode and the negative electrode, respectively.

Measurement of Electrical Properties of All-Solid-State Symmetric Batteries

Figure 7:
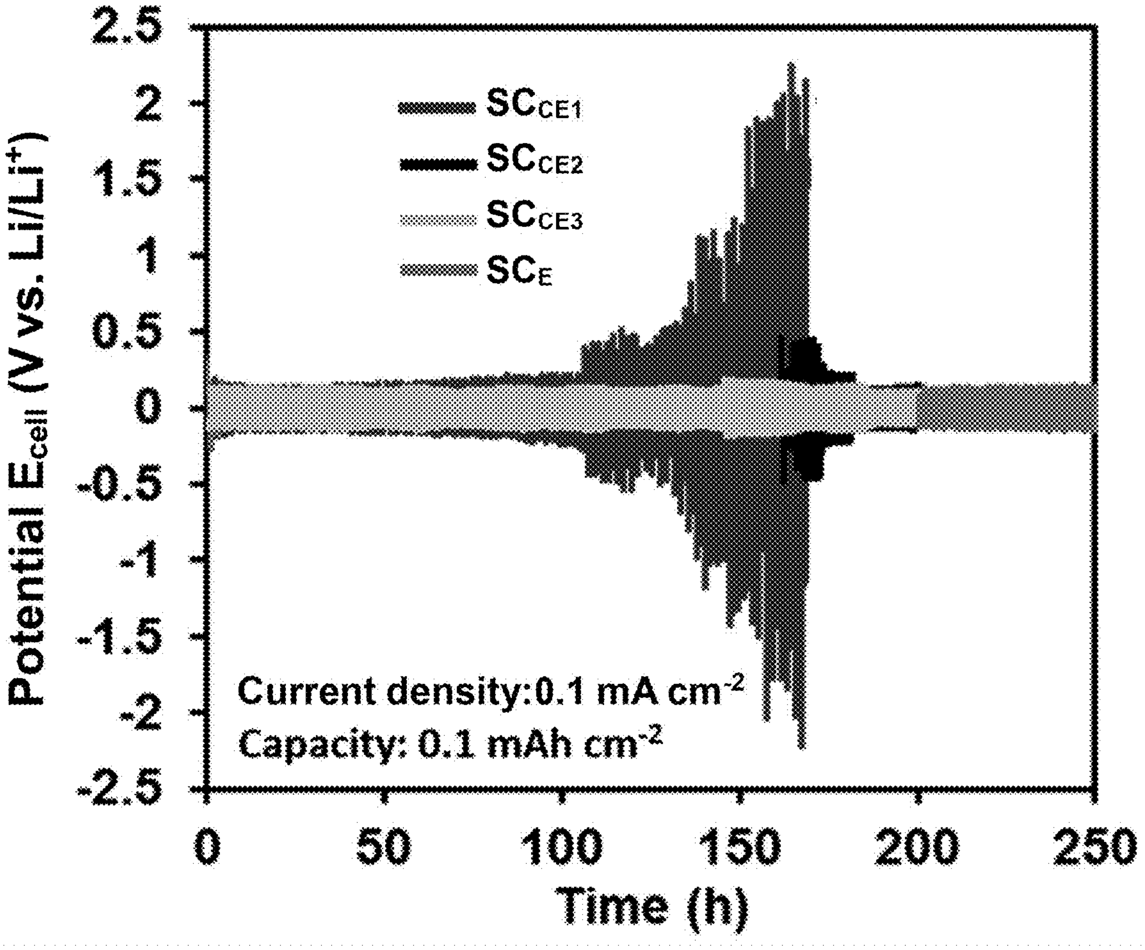
FIG. 7 depicts a graph illustrating potential-time relationships of all-solid-state symmetric batteries of Application Example 1 (SCE) and Comparative Application Examples 1 to 3 ($SC_{CE1}$, $SC_{CE2}$, and $SC_{CE3}$) in a plating/stripping polarization cycling test.
Figure 8:
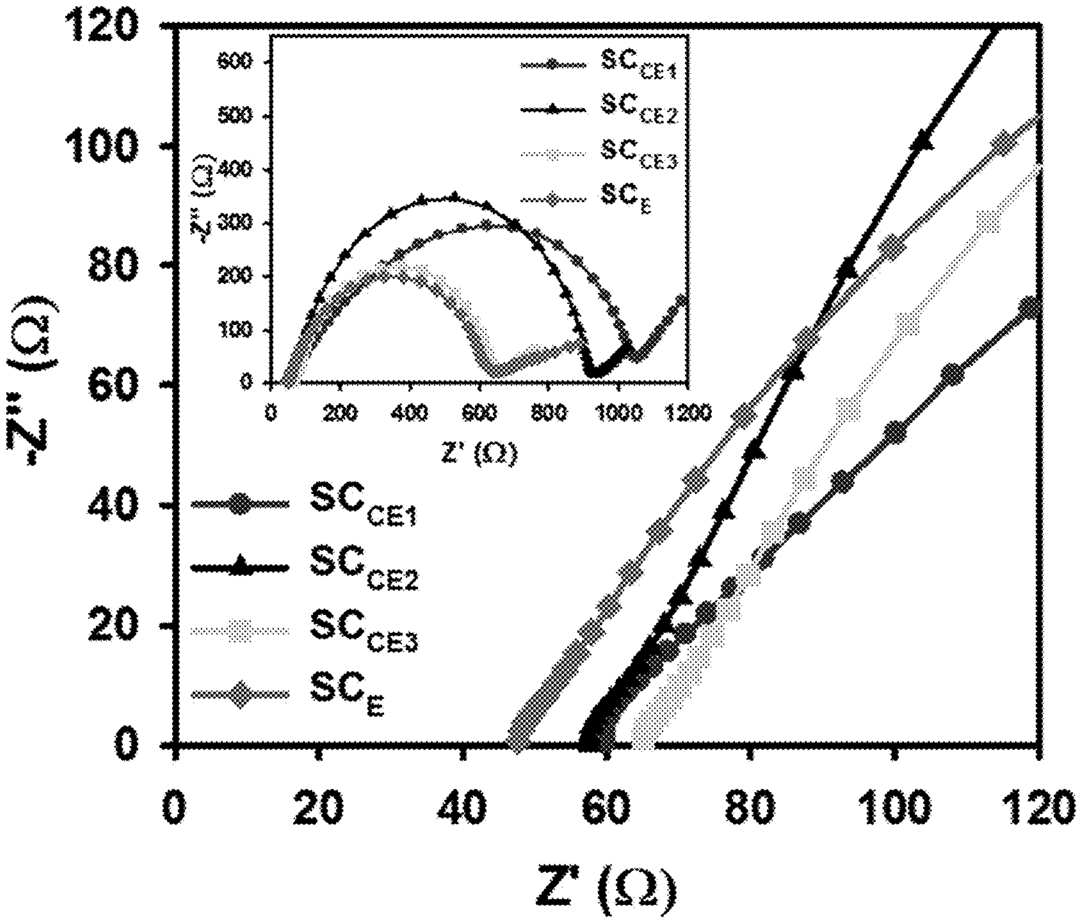
FIG. 8 depicts a graph illustrating alternating circuit (AC) impedance spectrums of the all-solid-state symmetric batteries of Application Example 1 ($SC_E$) and Comparative Application Examples 1 to 3 ($SC_{CE1}$, $SC_{CE2}$, and $SC_{CE3}$) after charge/discharge cycles at 0.1 $mA \cdot cm^{-2}$ for 100 hours.

The polarization potential difference of each of the all-solid-state symmetric battery ($SC_E$) of Application Example 1 and the all-solid-state symmetric batteries ($SC_{CE1}$ to $SC_{CE3}$) of Comparative Application Examples 1 to 3 was measured by a plating/striping polarization cycling test using a battery automatic tester (commercially available from Acutech Systems Co., Ltd., Taiwan; Model: BAT-750B) at a current density of 0.1 $mA \cdot cm^{-2}$ and a capacity per unit area of 0.1 $mAh \cdot cm^{-2}$. In addition, the bulk resistance ($R_b$) and the interfacial charge-transfer resistance ($R_{ct}$) of each of the all-solid-state symmetric battery ($SC_E$) of Application Example 1 and the all-solid-state symmetric batteries ($SC_{CE1}$ to $SC_{CE3}$) of Comparative Application Examples 1 to 3 were measured using an alternating current (AC) impedance spectroscopy after charge/discharge cycles at a current density of 0.1 $mA \cdot cm^{-2}$ for 100 hours. The measurement results are shown in FIGS. 7 to 8, and Table 1 below.

TABLE 1

| | Polarization potential difference (mV vs. $Li/Li^+$) | Bulk resistance $R_b$ (Ω) | Interfacial charge-transfer resistance $R_{ct}$ (Ω) |
|---|---|---|---|
| $SC_E$ | 241 | 47.69 | 591.16 |
| $SC_{CE1}$ | 257 | 59.86 | 990.36 |
| $SC_{CE2}$ | 262 | 57.66 | 876.73 |
| $SC_{CE3}$ | 278 | 65.03 | 593.03 |

As shown in Table 1, the polarization potential difference, the bulk resistance ($R_b$), and the interfacial charge-transfer resistance ($R_{ct}$) of the all-solid-state symmetric battery ($SC_E$) of Application Example 1 are much lower than those of the all-solid-state symmetric batteries ($SC_{CE1}$ to $SC_{CE3}$) of Comparative Application Examples 1 to 3, indicating that the all-solid-state symmetric battery ($SC_E$) of Application Example 1 has superior charge/discharge cycle stability.

Application Example 2: Preparation of an All-Solid-State Lithium Battery ($LB_E$)

The lithium foil electrode (E) of Example 1 was used as a negative electrode (i.e., an anode). A lithium nickel cobalt manganese oxide ($LiNi_{0.8}Co_{0.1}Mn_{0.1}O_2$, NCM811) electrode having a thickness of 40 μm was used as a positive electrode (i.e., a cathode). The three-layered sandwich structure, i.e., PVDF-HFP/PVDF-HFP@Al-LLZO/PVDF-HFP, as mentioned above in Application Example 1 was used as a composite polymer electrolyte membrane (CPE membrane). The lithium foil electrode (E), the lithium nickel cobalt manganese oxide electrode, and the three-layered sandwich structure were composed to form the all-solid-state lithium battery ($LB_E$).

Comparative Application Example 4: Preparation of an All-Solid-State Lithium Battery ($LB_{CE1}$)

The all-solid-state lithium battery ($LB_{CE1}$) of Comparative Application Example 4 was similar to that ($LB_E$) of Application Example 2, except that in the all-solid-state lithium battery ($LB_{CE1}$) of Comparative Application Example 4, the lithium foil electrode (CE1) of Comparative Example 1 was used as the negative electrode.

Comparative Application Example 5: Preparation of an All-Solid-State Lithium Battery ($LB_{CE2}$)

The all-solid-state lithium battery ($LB_{CE2}$) of Comparative Application Example 5 was similar to that ($LB_E$) of Application Example 2, except that in the all-solid-state lithium battery ($LB_{CE2}$) of Comparative Application Example 5, the lithium foil electrode (CE2) of Comparative Example 2 was used as the negative electrode.

Comparative Application Example 6: Preparation of an All-Solid-State Lithium Battery ($LB_{CE3}$)

The all-solid-state lithium battery ($LB_{CE3}$) of Comparative Application Example 6 was similar to that ($LB_E$) of Application Example 2, except that in the all-solid-state lithium battery ($LB_{CE3}$) of Comparative Application Example 6, the lithium foil electrode (CE3) of Comparative Example 3 was used as the negative electrode.

Figure 9:
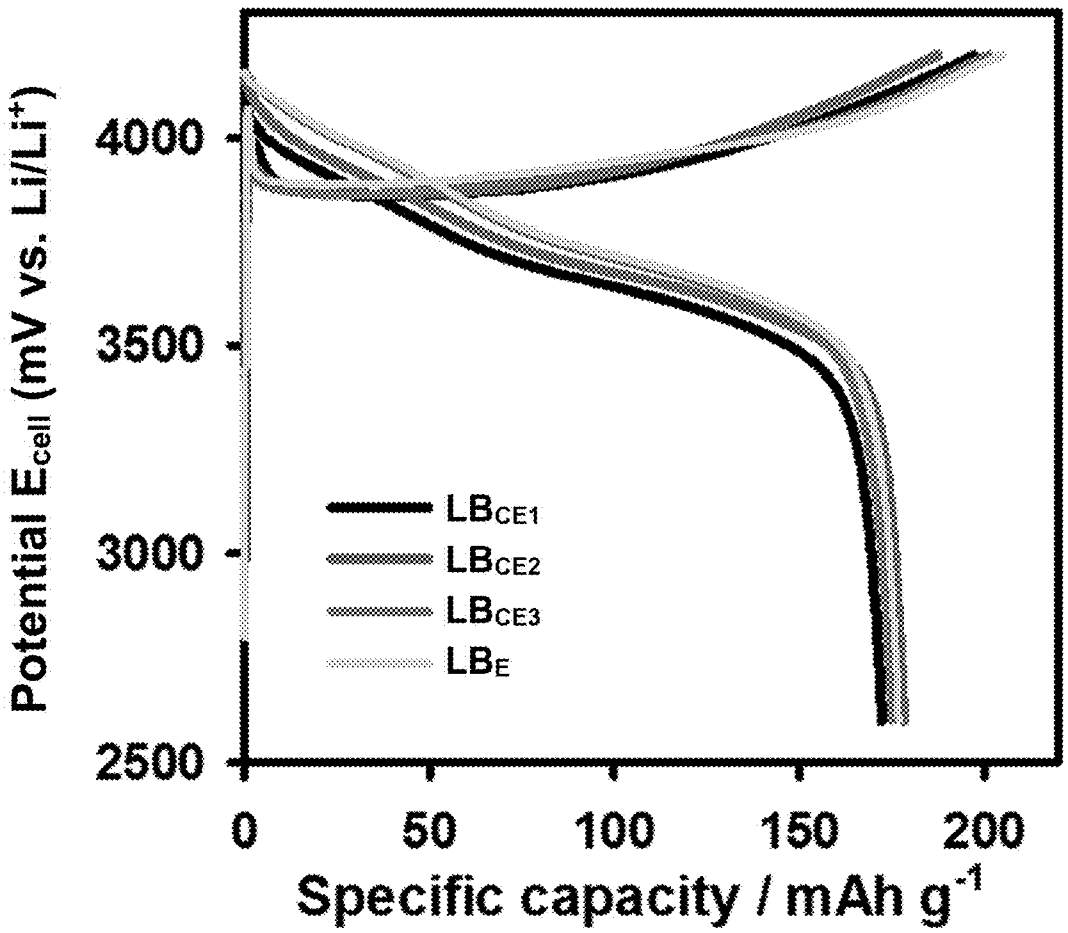
FIG. 9 depicts a graph illustrating specific capacity-potential relationships for all-solid-state lithium batteries of Application Example 2 ($LB_E$) and Comparative Application Examples 4 to 6 ($LB_{CE1}$, $LB_{CE2}$, and $LB_{CE3}$) after activation of 3 charge/discharge cycles at 0.1 C.
Figure 10:
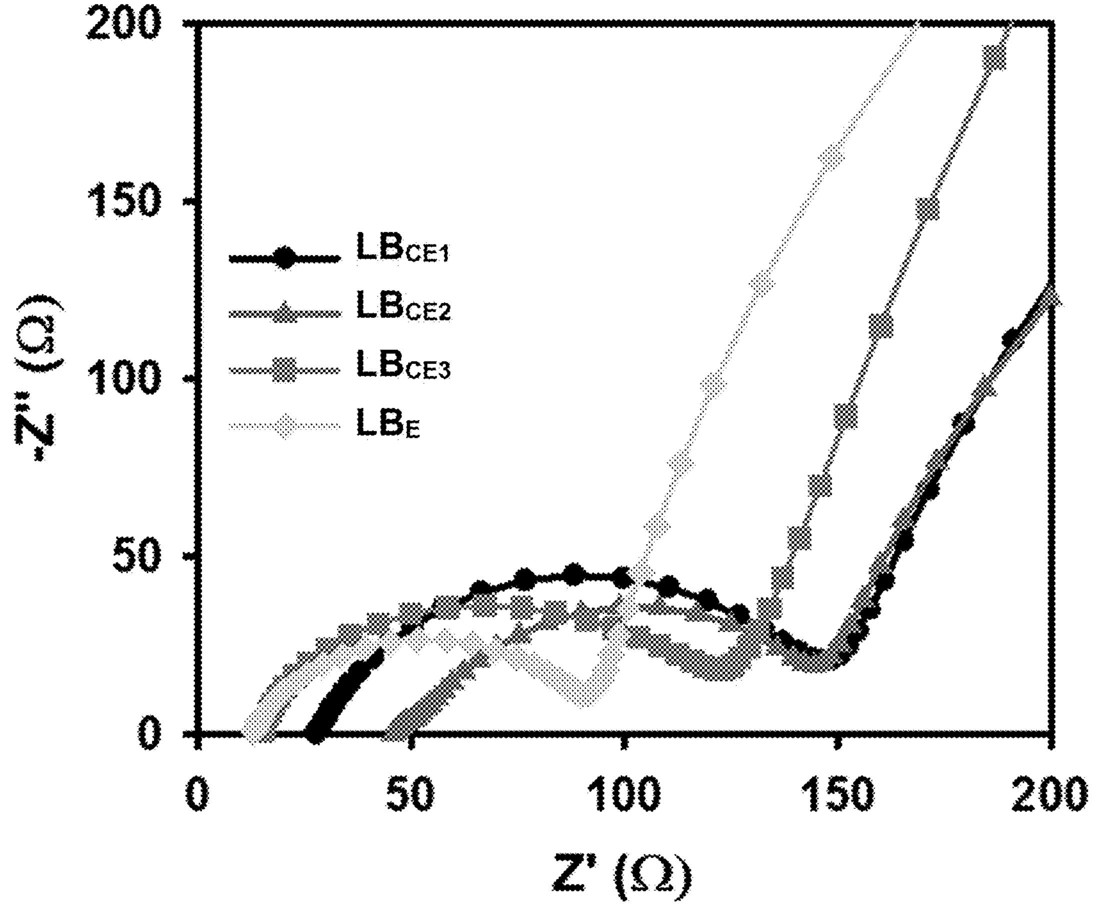
FIG. 10 depicts a graph illustrating AC impedance spectra of the all-solid-state lithium batteries of Application Example 2 ($LB_E$) and Comparative Application Examples 4 to 6 ($LB_{CE1}$, $LB_{CE2}$, and $LB_{CE3}$) after the activation of 3 charge/discharge cycles at 0.1 C.
Figure 11:
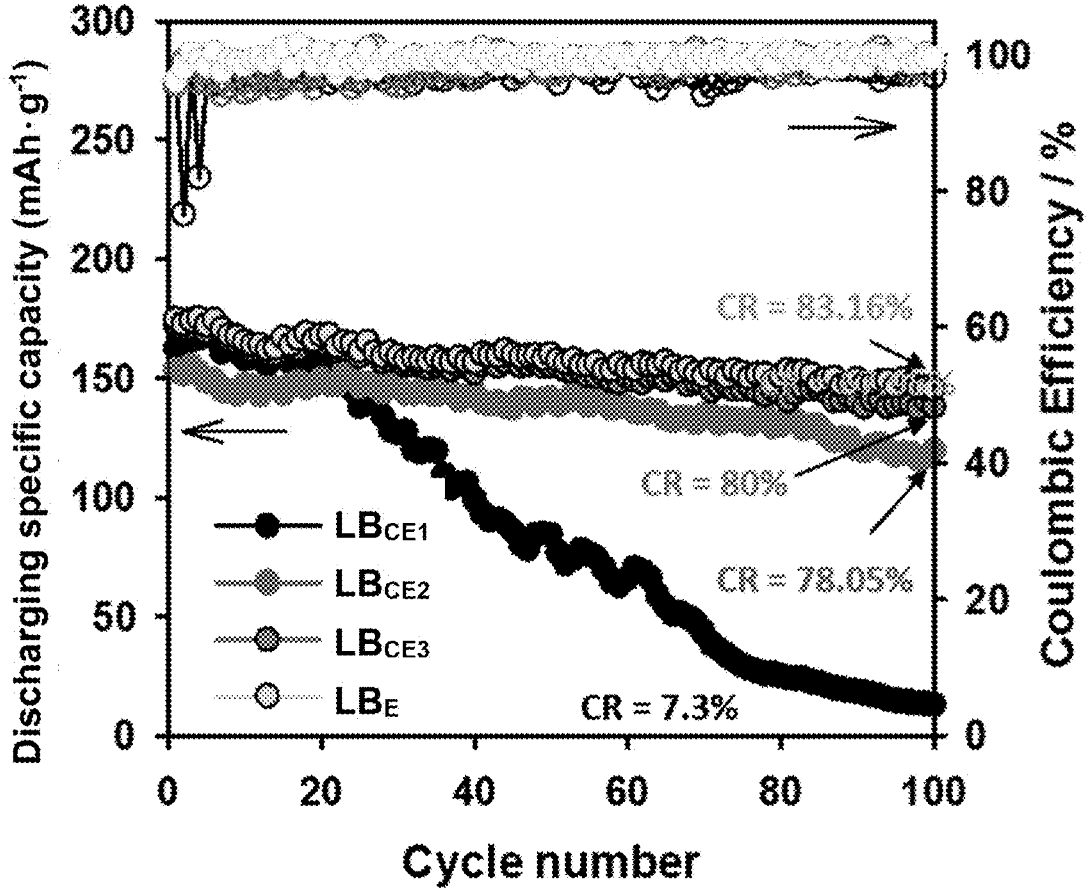
FIG. 11 depicts a graph illustrating cycle number-coulombic efficiency relationships and cycle number-discharging specific capacity relationships for the all-solid-state lithium batteries of Application Example 2 ($LB_E$) and Comparative Application Examples 4 to 6 ($LB_{CE1}$, $LB_{CE2}$, and $LB_{CE3}$) after 100 charge/discharge cycles at 0.2 C.
Figure 12:
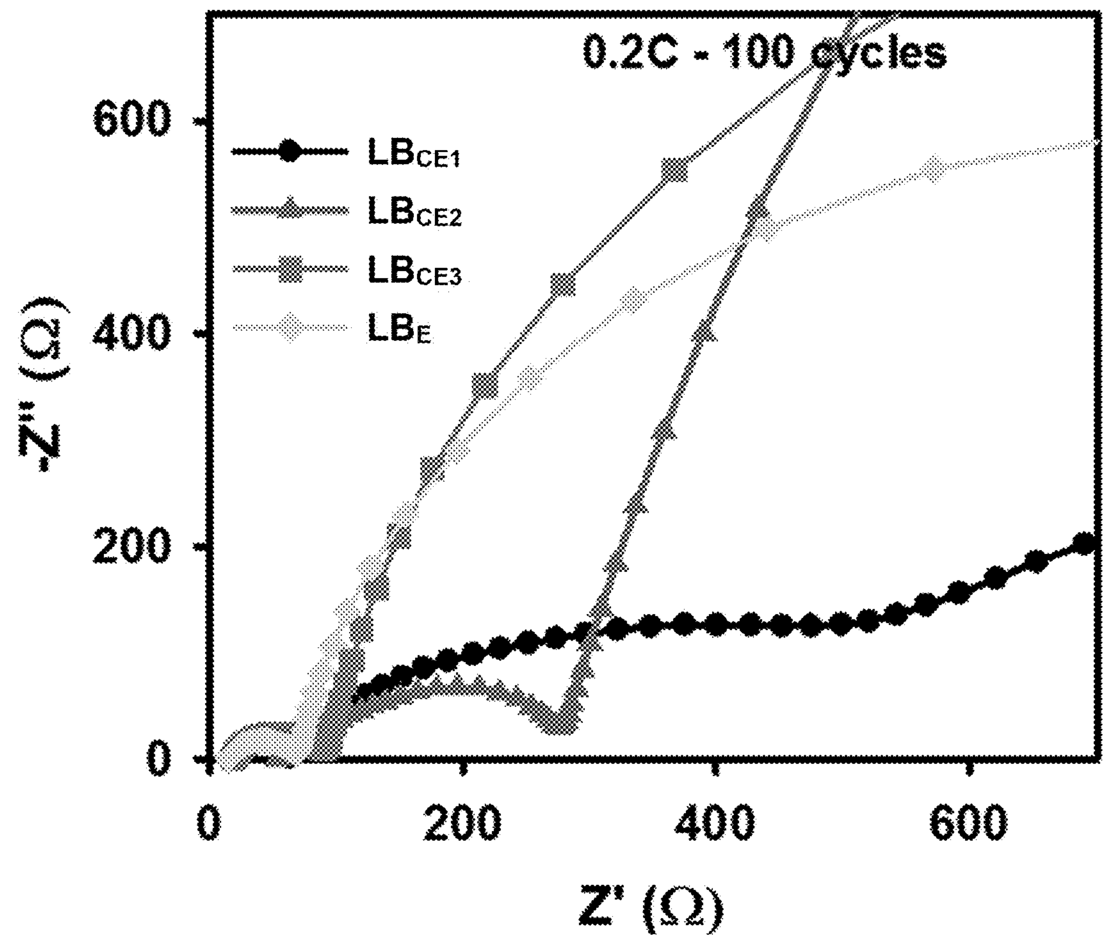
FIG. 12 depicts a graph illustrating AC impedance spectrums of the all-solid-state lithium batteries of Application Example 2 ($LB_E$) and Comparative Application Examples 4 to 6 ($LB_{CE1}$, $LB_{CE2}$, and $LB_{CE3}$) after 100 charge/discharge cycles at 0.2 C.

Measurement of Electrochemical Properties of All-Solid-State Lithium Batteries By using the battery automatic tester as mentioned above, the initial specific capacity of each of the all-solid-state lithium battery ($LB_E$) of Application Example 2 and the all-solid-state lithium batteries ($LB_{CE1}$ to $LB_{CE3}$) of Comparative Application Examples 4 to 6 was measured after 3 charge/discharge activation cycles at a charge current of 0.1 C and a discharge current of 0.1 C at room temperature, the coulombic efficiency of each of the all-solid-state lithium battery ($LB_E$) of Application Example 2 and the all-solid-state lithium batteries ($LB_{CE1}$ to $LB_{CE3}$) of Comparative Application Examples 4 to 6 was measured over 100 charge/discharge cycles at a charge current of 0.2 C and a discharge current of 0.2 C at room temperature, and the capacity retention (CR) of each of the all-solid-state lithium battery ($LB_E$) of Application Example 2 and the all-solid-state lithium batteries ($LB_{CE1}$ to $LB_{CE3}$) of Comparative Application Examples 4 to 6 was measured after 100 charge/discharge cycles at a charge current of 0.2 C and a discharge current of 0.2 C at room temperature. By using the AC impedance spectroscopy, the bulk resistance ($R_b$) and the interfacial charge-transfer resistance ($R_{ct}$) of each of the all-solid-state lithium battery ($LB_E$) of Application Example 2 and the all-solid-state lithium batteries ($LB_{CE1}$ to $LB_{CE3}$) of Comparative Application Examples 4 to 6 were measured after 3 charge/discharge activation cycles at a charge current of 0.1 C and a discharge current of 0.1 C at room temperature, and after 100 charge/discharge cycles at a charge current of 0.2 C and a discharge current of 0.2 C at room temperature, respectively. The measurement results after 3 charge/discharge activation cycles at a charge current of 0.1 C and a discharge current of 0.1 C at room temperature are shown in FIGS. 9 to 10 and Table 2 below, and the measurement results after 100 charge/discharge cycles at a charge current of 0.2 C and a discharge current of 0.2 C at room temperature are shown in FIGS. 11 to 12 and Table 3 below.

TABLE 2

| | Initial specific capacity ($mAh \cdot g^{-1}$) | Bulk resistance $R_b$ (Ω) | Interfacial charge-transfer resistance $R_{ct}$ (Ω) |
|---|---|---|---|
| $LB_E$ | 177.03 | 13.07 | 78.24 |
| $LB_{CE1}$ | 173.64 | 27.61 | 118.73 |
| $LB_{CE2}$ | 178.29 | 45.76 | 98.78 |
| $LB_{CE3}$ | 174.89 | 14.97 | 106.42 |

TABLE 3

| | Capacity retention CR (%) | Bulk resistance $R_b$ (Ω) | Interfacial charge-transfer resistance $R_{ct}$ (Ω) |
|---|---|---|---|
| $LB_E$ | 83.16 | 15.21 | 53.45 |
| $LB_{CE1}$ | 7.30 | 63.76 | 411.29 |
| $LB_{CE2}$ | 78.05 | 53.03 | 224.14 |
| $LB_{CE3}$ | 80.00 | 18.22 | 71.75 |

As shown in Tables 2 to 3 and FIG. 11, although the initial specific capacity and the coulombic efficiency of the all-solid-state lithium battery ($LB_E$) of Application Example 2 are close to those of each of the all-solid-state lithium batteries ($LB_{CE1}$ to $LB_{CE3}$) of Comparative Application Examples 4 to 6, the capacity retention of the all-solid-state lithium battery ($LB_E$) of Application Example 2 is greater than that of each of the all-solid-state lithium batteries ($LB_{CE1}$ to $LB_{CE3}$) of Comparative Application Examples 4 to 6 after 100 charge/discharge cycles. Specifically, the capacity retention of the all-solid-state lithium battery ($LB_{CE3}$) of Comparative Application Example 4 is reduced significantly to 7.30% after 100 charge/discharge cycles. In addition, the bulk resistance ($R_b$) and the interfacial charge-transfer resistance ($R_{ct}$) of the all-solid-state lithium battery ($LB_E$) of Application Example 2 is much lower than those of each of the all-solid-state lithium batteries ($LB_{CE1}$ to $LB_{CE3}$) of Comparative Application Examples 4 to 6 after 3 charge/discharge activation cycles and after 100 charge/discharge cycles, indicating that the all-solid-state lithium battery ($LB_E$) of Application Example 2 has superior charge/discharge cycle stability.

In sum, by having the lithium foil anode made by the method of this disclosure, the all-solid-state lithium battery has a lower polarization potential difference, a lower bulk resistance after charge/discharge cycles, a lower interfacial charge-transfer resistance after charge/discharge cycles and a higher capacity retention after charge/discharge cycles, and therefore the all-solid-state lithium battery may exhibit superior charge/discharge cycle stability.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for making a lithium foil anode of an all-solid-state lithium battery consisting of the lithium foil anode, a cathode, and a composite polymer electrolyte membrane, the method comprising the steps of:

a) dispersing a carbon nanomaterial in water to form a dispersion;

b) mixing dopamine with the dispersion so as to permit the dopamine to perform a polymerization reaction in the dispersion to obtain a surface-modified carbon nanomaterial which is surface-modified by polydopamine;

c) forming a regular sub-millimeter scale textured structure on a lithium foil;

d) mixing the surface-modified carbon nanomaterial with a lithium ion-containing polymer to form a mixture; and e) applying the mixture on the lithium foil;

wherein step c) is performed by cold pressing the lithium foil with a metal mesh having a textured pattern for forming the regular sub-millimeter scale textured structure, wherein in step c), the regular sub-millimeter scale textured structure includes a plurality of columns of first depressions formed on a surface of the lithium foil, the columns of the first depressions being displaced from each other in a first direction, each of the columns of the first depressions including a plurality of the first depressions which are displaced from each other in a second direction transverse to the first direction, the first depressions of each of the columns of the first depressions being staggered with the first depressions of an adjacent one of the columns of the first depressions; and a plurality of rows of second depressions formed on the surface of the lithium foil, the rows of the second depressions being displaced from each other in the second direction, each of the rows of the second depressions including a plurality of the second depressions which are displaced from each other in the first direction, the second depressions of each of the rows of the second depressions being staggered with the second depressions of an adjacent one of the rows of the second depressions such that one of the first depressions is surrounded by four of the second depressions and one of the second depressions is surrounded by four of the first depressions, and wherein each of the first and second depressions is configured as a spindle-like shape having a length ranging from 450 μm to 650 μm, and wherein a source of a lithium ion of the lithium ion-containing polymer is selected from lithium hydroxide, lithium nitrate, lithium acetate, lithium chloride, lithium hydrogen phosphate, lithium phosphate, lithium carbonate, or combinations thereof.

2. The method of claim 1, wherein the cold pressing is performed at a pressure ranging from 25 psi to 150 psi.

3. The method of claim 1, wherein the carbon nanomaterial is selected from the group consisting of carbon fiber, carbon nanotube, graphene, graphene oxide, carbon black, and combinations thereof.

4. The method of claim 1, wherein in step b), the polymerization reaction is performed by introducing a tris (hydroxymethyl) aminomethane buffer solution in the dispersion.

5. The method of claim 4, wherein in step b), the polymerization reaction is performed in the dispersion having a pH value ranging from 8.0 to 9.0.

6. The method of claim 1, wherein in step d), a weight ratio of the surface modified carbon nanomaterial to the lithium ion-containing polymer ranges from 1:2 to 1:20.

7. The method of claim 1, wherein in step c), the metal mesh is selected from the group consisting of a copper mesh, a nickel mesh, a titanium mesh, a platinum mesh, a stainless steel mesh, and combinations thereof.

* * * * *